US012585447B2

(12) United States Patent (10) Patent No.: US 12,585,447 B2

Dave et al. (45) Date of Patent: Mar. 24, 2026

(54) FAULT TOLERANT REMOTE APPLICATION INSTALLATION

(71) Applicant: Google LLC, Mountain View, CA (US)

(72) Inventors: Yash Dave, Sunnyvale, CA (US); Vicki Vishwanath Amin, San Jose, CA (US)

(73) Assignee: Google LLC, Mountain View, CA (US)

( * ) Notice: Subject to any disclaimer, the term of this patent is extended or adjusted under 35 U.S.C. 154(b) by 230 days.

(21) Appl. No.: 18/482,690

(22) Filed: Oct. 6, 2023

(65) Prior Publication Data

US 2025/0117203 A1 Apr. 10, 2025

(51) Int. Cl.
*G06F 9/445* (2018.01)
*G06F 8/61* (2018.01)

(52) U.S. Cl.
CPC ...................................... *G06F 8/61* (2013.01)

(58) Field of Classification Search
CPC ......................................................... G06F 8/61
See application file for complete search history.

(56) References Cited

U.S. PATENT DOCUMENTS

| | | | | |
|---|---|---|---|---|
| 6,134,584 | A * | 10/2000 | Chang | G06F 16/957 |
| | | | | 709/219 |
| 9,098,366 | B1 * | 8/2015 | Adib | G06F 8/61 |
| 10,452,375 | B1 * | 10/2019 | Nightingale | G06F 8/658 |
| 2010/0184422 | A1 | 7/2010 | Ahrens | |
| 2012/0054738 | A1 * | 3/2012 | Tseng | G06F 8/61 |
| | | | | 717/177 |
| 2014/0179272 | A1 | 6/2014 | Zhang et al. | |

| | | | | |
|---|---|---|---|---|
| 2016/0085763 | A1 | 3/2016 | Tatourian et al. | |
| 2018/0060054 | A1 | 3/2018 | Arrouye et al. | |
| 2018/0157473 | A1 | 6/2018 | Raghavan | |
| 2019/0332370 | A1 * | 10/2019 | Christiansen | G06F 8/65 |
| 2021/0055922 | A1 | 2/2021 | Naravanekar et al. | |

FOREIGN PATENT DOCUMENTS

| | | |
|---|---|---|
| CN | 115185416 A | 10/2022 |
| WO | 2022271189 A1 | 12/2022 |

OTHER PUBLICATIONS

International Search Report and Written Opinion of International Application No. PCT/US2024/049819 dated Jan. 29, 2025, 14 pp.
Elsa et al., "How to Remotely Control Android Phone/Devices from any Device", Sep. 21, 2023, 12 pp., Retrieved from https://www.airdroid.com.
Mukherjee et al., "Install Android TV apps from smartphone: Here's how you can do it now", Hi Tech, Aug. 21, 2022, 18 pp., Retrieved from https://tech.hindustantimes.com.
U.S. Appl. No. 18/480,980, filed Oct. 4, 2023, naming inventors Dave et al.

* cited by examiner

*Primary Examiner* — S. Sough
*Assistant Examiner* — Mohammad H Kabir
(74) *Attorney, Agent, or Firm* — Shumaker & Sieffert, P.A.

(57) ABSTRACT

A first computing device may receive a request to install an application at the first computing device from a second computing device signed into a same user account as the first computing device. The first computing device may, in response to receiving the request and based on the first computing device not having sufficient available storage space to install the application, download a stub associated with the application from a computing system. The first computing device may install the stub associated with the application.

17 Claims, 9 Drawing Sheets

RECEIVE A REQUEST FROM A COMPUTING DEVICE TO DOWNLOAD AN APPLICATION — 502

DETERMINE WHETHER THE COMPUTING DEVICE HAS SUFFICIENT AVAILABLE STORAGE SPACE TO INSTALL THE APPLICATION — 504

YES

NO

SEND THE APPLICATION TO THE COMPUTING DEVICE — 506

508 — SEND A STUB ASSOCIATED WITH THE APPLICATION TO THE COMPUTING DEVICE

RECEIVE A REQUEST FOR THE COMPUTING
DEVICE TO INSTALL AN APPLICATION — 602

ATTEMPT TO DOWNLOAD THE APPLICATION
FROM A COMPUTING SYSTEM — 604

DETERMINE WHETHER THE
COMPUTING DEVICE IS ABLE
TO SUCCESSFULLY
DOWNLOAD THE APPLICATION — 606

YES

NO

INSTALL THE APPLICATION — 608

610 — SCHEDULE DOWNLOADING OF
THE APPLICATION FOR A
LATER TIME

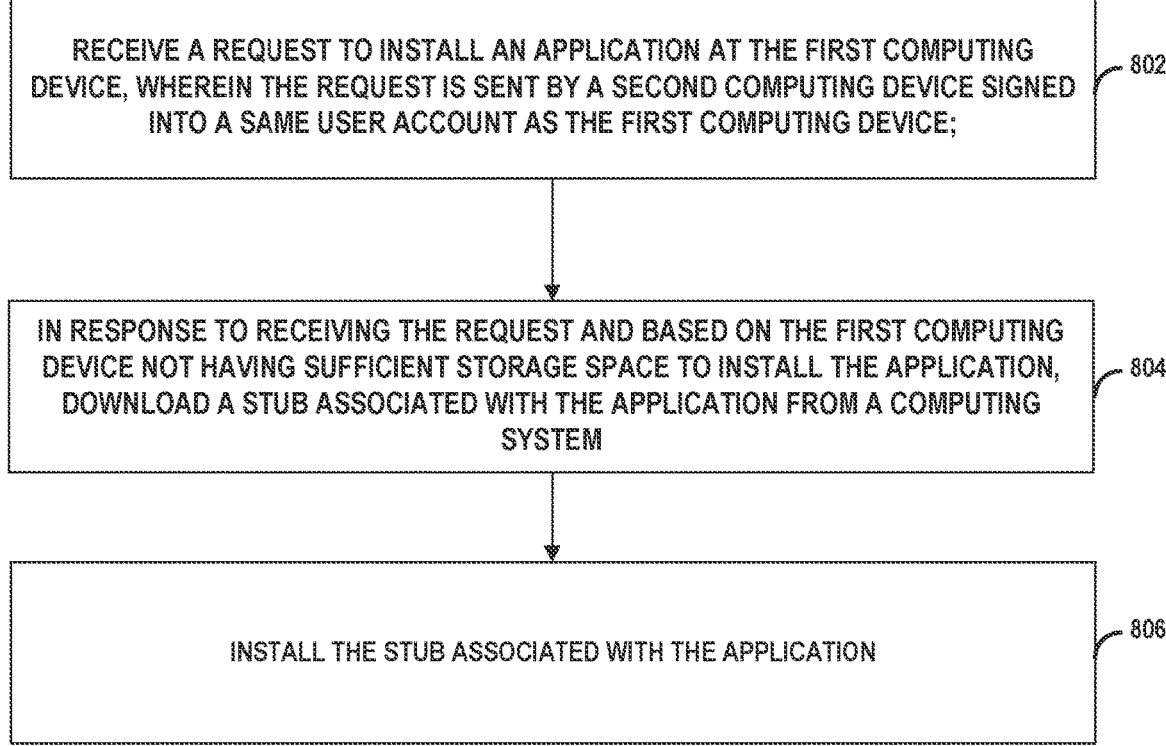

RECEIVE A REQUEST TO INSTALL AN APPLICATION AT THE FIRST COMPUTING DEVICE, WHEREIN THE REQUEST IS SENT BY A SECOND COMPUTING DEVICE SIGNED INTO A SAME USER ACCOUNT AS THE FIRST COMPUTING DEVICE;          ~ 802

IN RESPONSE TO RECEIVING THE REQUEST AND BASED ON THE FIRST COMPUTING DEVICE NOT HAVING SUFFICIENT STORAGE SPACE TO INSTALL THE APPLICATION, DOWNLOAD A STUB ASSOCIATED WITH THE APPLICATION FROM A COMPUTING SYSTEM          ~ 804

INSTALL THE STUB ASSOCIATED WITH THE APPLICATION          ~ 806

FIG. 8

RECEIVE, FROM A COMPUTING DEVICE, A REQUEST TO INSTALL AN APPLICATION ⌐ 902

IN RESPONSE TO RECEIVING THE REQUEST AND BASED ON THE COMPUTING DEVICE NOT HAVING SUFFICIENT STORAGE SPACE TO INSTALL THE APPLICATION, SEND, TO THE COMPUTING DEVICE, A STUB ASSOCIATED WITH THE APPLICATION FOR INSTALLATION AT THE COMPUTING DEVICE ⌐ 904

FAULT TOLERANT REMOTE APPLICATION INSTALLATION

BACKGROUND

A user may use a variety of different computing devices that are signed into the same user account. For example, a user may use a smartphone, a smartwatch, and/or a tablet computer that are all signed into the same user account.

SUMMARY

In general, various aspects of the techniques described in this disclosure are directed to fault tolerant application installations at remote computing devices. A user may use a computing device signed into a user account to control the installation of applications at other computing devices that are also signed into the same user account. For example, a first computing device signed into a user account may send a request to install an application to a second computing device signed into the same user account, and the second computing device may, in response, download and install the application.

In some examples, the first computing device may send a request to install an application to a second computing device via a computing system. The first computing device may send the request to the computing system, and the computing system may forward the request to the second computing device. If the computing system is unable to forward the request to the second computing device, such as when the second computing device is offline, the computing system may queue the request and may, in response to receiving a query from the second computing device for requests to install applications queued at the computing system, send the queued request to the second computing device.

The second computing device may, in response to receiving a request by the first computing device to install an application, determine whether the second computing device has sufficient available storage space to install the application. If the second computing device determines that it has sufficient available storage space to install the application, the second computing device may download the application from the computing system and may install the downloaded application. If the second computing device determines that it does not have sufficient available storage space to install the application, the second computing device may download a stub associated with the application from the computing system and may install the downloaded stub associated with the application.

Further, the second computing device may, in response to receiving a request by the first computing device to install an application, attempt to download the application from the computing system. If the second computing device fails to download the application, the second computing device may retry downloading the application at a later time.

The techniques of this disclosure may address problems caused by computing devices that are not always online and connected to the Internet by enabling the computing system, when a recipient computing device is offline, to queue requests to the offline computing device that the recipient computing device may retrieve from the computing system when the computing device returns back online. The techniques of this disclosure may also address problems caused by computing devices that may have intermittent Internet connectivity issues by enabling a computing device suffering from such connectivity issues to be able to retry downloading of applications when the computing device has more reliable internet connectivity. In addition, the techniques of this disclosure may also reduce failures in installing applications caused by insufficient storage space, which may address issues that are often encountered by mobile computing devices having limited storage space.

In some aspects, the techniques described herein relate to a method including: receiving, by one or more processors of a first computing device, a request to install an application at the first computing device, wherein the request is sent by a second computing device signed into a same user account as the first computing device; in response to receiving the request and based on the first computing device not having sufficient available storage space to install the application, downloading, by the one or more processors, a stub associated with the application from a computing system, and installing, by the first computing device, the stub associated with the application.

In some aspects, the techniques described herein relate to a computing device including: a memory that stores instructions; and one or more processors that execute the instructions to: receive a request to install an application at the computing device, wherein the request is sent by a second computing device signed into a same user account as the computing device; in response to receiving the request and based on the computing device not having sufficient available storage space to install the application, download a stub associated with the application from a computing system, and install the stub associated with the application.

In some aspects, the techniques described herein relate to a computer-readable storage medium storing instructions that, when executed, cause one or more processors of a first computing device to: receive a request to install an application at the first computing device, wherein the request is sent by a second computing device signed into a same user account as the first computing device; in response to receiving the request and based on the first computing device not having sufficient available storage space to install the application, download a stub associated with the application from a computing system, and install the stub associated with the application.

In some aspects, the techniques described herein relate to a method including: receiving, by one or more processors of a computing system and from a computing device, a request to download an application; and in response to receiving the request and based on the computing device not having sufficient available storage space to install the application, sending, by the one or more processors and to the computing device, a stub associated with the application for installation at the computing device.

In some aspects, the techniques described herein relate to a computing system including: a memory that stores instructions; and one or more processors that execute the instructions to: receive, from a computing device, a request to download an application; and in response to receiving the request and based on the computing device not having sufficient available storage space to install the application, send, to the computing device, a stub associated with the application for installation at the computing device.

In some aspects, the techniques described herein relate to a computer-readable storage medium storing instructions that, when executed, cause one or more processors of a computing system to: receive, from a computing device, a request to download an application; and in response to receiving the request and based on the computing device not having sufficient available storage space to install the application, send, to the computing device, a stub associated with the application for installation at the computing device.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 8 is a flowchart illustrating an example mode of operation for a computing device to perform fault tolerant application installs, in accordance with one or more techniques of the present disclosure.

DETAILED DESCRIPTION

Figure 1:
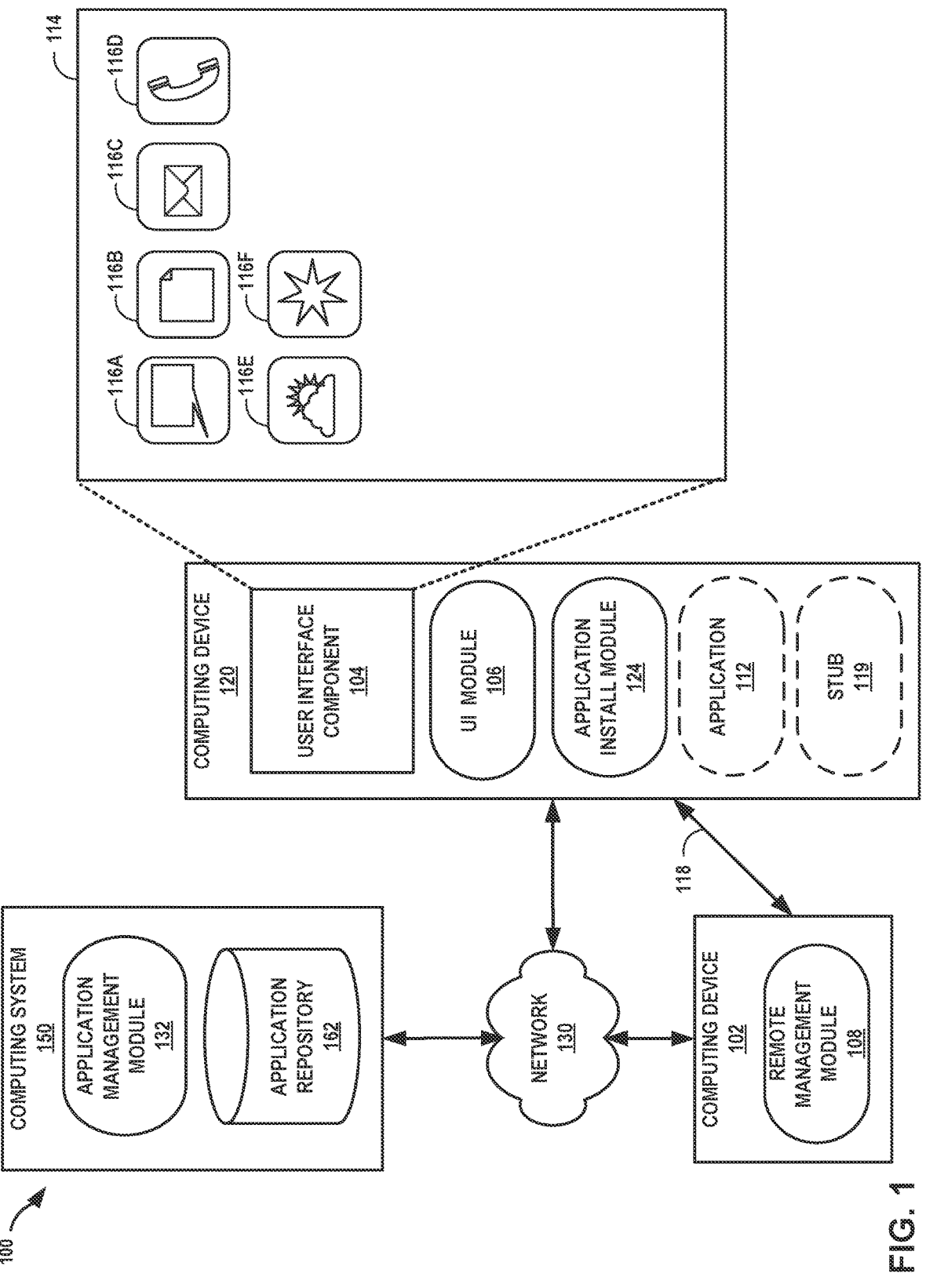
FIG. 1 is a conceptual diagram illustrating an example environment for performing fault tolerant remote application installations, in accordance with one or more aspects of the present disclosure.

FIG. 1 is a conceptual diagram illustrating an example environment for performing fault tolerant remote application installations, in accordance with one or more aspects of the present disclosure. In the example of FIG. 1, environment 100 may include a computing device 102, a computing device 120, and a computing system 150 that communicate via a network 130.

Computing system 150 may be any suitable remote computing system, such as one or more desktop computers, laptop computers, mainframes, servers, cloud computing systems, virtual machines, etc. capable of sending and receiving information via network 130. In some examples, computing system 150 may represent a cloud computing system that provides one or more services via network 130. That is, in some examples, computing system 150 may be a distributed computing system. One or more computing devices, such as computing device 102 and/or computing device 120, may access the services provided by the cloud by communicating with computing system 150 via network 130. While described herein as being performed at least in part by computing system 150, various aspects of the present disclosure may be performed by one or more other devices, such as computing device 102 or computing device 120. That is, in some examples, computing device 102 and/or computing device 120 may be operable to perform one or more aspects of the techniques of the present disclosure alone or in combination.

Computing system 150 may include application management module 132. Application management module 132 may perform operations described herein using software, hardware, firmware, or a mixture of both hardware, software, and firmware residing in and executing on computing system 150 or at one or more other remote computing devices. In some examples, application management module 132 may be implemented as hardware, software, and/or a combination of hardware and software. Computing system 150 may execute application management module 132 with one or more processors. Computing system 150 may execute application management module 132 as or within a virtual machine executing on underlying hardware.

Application management module 132 may be implemented in various ways. For example, application management module 132 may be implemented as part of an operating system of computing system 150. Other examples of computing system 150 that implement techniques of this disclosure may include additional components not shown in FIG. 1.

Computing system 150 may also include application repository 162. Application repository 162 may be a data store of applications that can be downloaded from computing system 150.

Computing system 150 may act as an application distribution platform, such as an app marketplace, for computing devices such as computing device 102 and computing device 120. For example, computing system 150 may store a repository of applications that can be installed at computing devices, and computing devices may communicate with computing system 150 to download and install applications and to download and install updates for applications.

Network 130 may be any suitable network that enables communication between computing device 102, computing device 120, and/or computing system 150. Network 130 may include a wide-area network such as the Internet, a local-area network (LAN), a personal area network (PAN) (e.g., Bluetooth®), an enterprise network, a wireless network, a cellular network, a telephony network, a Metropolitan area network (e.g., WiFi™, WAN, WiMAX, etc.), one or more other types of networks, or a combination of two or more different types of networks (e.g., a combination of a cellular network and the Internet).

Computing device 102 and computing device 120 may include, but is not limited to, portable or mobile devices such as mobile phones (including smart phones), laptop computers, tablet computers, wearable computing devices such as smart watches or computerized eyewear (including virtual reality headsets, augmented reality headsets, and the like), smart television platforms such as over the top (OTT) devices, cameras, computerize appliances, vehicle head units, etc. In some examples, computing device 102 may be a smart phone or a tablet computer while computing device 120 may be a wearable computing device, a smart television platform, or a vehicle head unit.

Computing device 102 may include remote management module 108. Remote management module 108 may perform operations described herein using software, hardware, firmware, or a mixture of both hardware, software, and firmware residing in and executing on computing device 102. In some examples, remote management module 108 may be implemented as hardware, software, and/or a combination of hardware and software. Computing device 102 may execute remote management module 108 with one or more processors. Remote management module 108 may be implemented in various ways. For example, remote management module 108 may be implemented as a downloadable or pre-installed application or "app." In another example, remote management module 108 may be implemented as part of an operating system of computing device 102. Other examples of computing devices 102 that implement techniques of this disclosure may include additional components not shown in FIG. 1.

Computing device 120 may include user interface component 104 ("UIC 104") user interface module 106 ("UI module 106"), and application install module 124. UI module 106 and application install module 124 may perform operations described herein using software, hardware, firmware, or a mixture of both hardware, software, and firmware residing in and executing on computing device 120 or at one or more other remote computing devices. In some examples, UI module 106 and application install module 124 may be implemented as hardware, software, and/or a combination of hardware and software. Computing device 120 may execute UI module 106 and application install module 124 with one or more processors. UI module 106 and application install module 124 may be implemented in various ways. For example, any of UI module 106 and application install module 124 may be implemented as a downloadable or pre-installed application or "app." In another example, any of UI module 106 and application install module 124 may be implemented as part of an operating system of computing device 120. Other examples of computing device 120 that implement techniques of this disclosure may include additional components not shown in FIG. 1.

UIC 104 of computing device 120 may function as an input device for computing device 120 and as an output device. For instance, UIC 104 may function as an input device using a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. UIC 104 may function as an output device using any one or more of a liquid crystal display (LCD), dot matrix display, light emitting diode (LED) display, microLED, organic light-emitting diode (OLED) display, e-ink, or similar monochrome or color display capable of outputting visible information to the user of computing device 120.

In some examples, UIC 104 may include a presence-sensitive screen that may receive tactile user input from a user of computing device 120. UIC 104 may receive the tactile user input by detecting one or more taps and/or gestures from a user of computing device 120 (e.g., the user touching or pointing to one or more locations of UIC 104 with a finger or a stylus pen). The presence-sensitive screen of UIC 104 may present output to a user. UIC 104 may present the output as a user interface, which may be related to functionality provided by computing device 120. For example, UIC 104 may present various functions and applications executing on computing device 120 such as an electronic message application, a messaging application, a map application, etc.

UI module 106 may interpret inputs detected at UIC 104 (e.g., as a user provides one or more gestures at a location of UIC 104 at which a user interface is displayed). UI module 106 may relay information about the inputs detected at UIC 104 to one or more associated platforms, operating systems, applications, and/or services executing at computing device 120 to cause computing device 120 to perform a function. UI module 106 may also receive information and instructions from one or more associated platforms, operating systems, applications, and/or services executing at computing device 120 (e.g., application install module 124) for generating a graphical user interface (GUI). In addition, UI module 106 may act as an intermediary between the one or more associated platforms, operating systems, applications, and/or services executing at computing device 120 and various output devices of computing device 120 (e.g., speakers, LED indicators, vibrators, etc.) to produce output (e.g., graphical, audible, tactile, etc.) with computing device 120.

A single user may own and/or use a variety of different computing devices that are signed into the same user account associated with the user. Such a user account may serve as a centralized account for the computing devices used by the user to enable each of the computing devices to link the computing devices to the user and to enable the computing devices access various services and products, synchronize data, purchase apps and content, and the like. For example, applications installed at computing devices signed into a user account may also be associated with the user account, such that when a user sets up a new computing device, the user may sign the new computing device into the user account to automatically download, to the new computing device, applications that are associated with the user account.

It should be noted that a user account as described throughout this disclosure is not a superuser account or administrator account used by an administrator in an enterprise to manage computing devices used by a variety of different users in the enterprise. Instead, the user account described throughout this disclosure is used by an end user of multiple computing devices to serve as a centralized account for the end user that is used to link computing devices to the end user and to enable the computing devices of the user to access various services and products, synchronize data, purchase apps and content, and the like.

A user that uses multiple computing devices, such as computing device 102 and computing device 120, that are signed into the same user account associated with the user, may use one of the computing devices used by the user to manage the other computing devices used by the user. The user may select the computing device that is to manage other computing devices used by the user based on factors such as the ease of interacting with the computing device. For example, if the user uses a smartphone, a smartwatch, and an OTT device, the user may select the smartphone as the computing device that manages the smartwatch and the OTT device used by the user.

In the example of FIG. 1, a user may use both computing device 102 and computing device 120, and both computing device 102 and computing device 120 are signed into the same user account associated with the user. The user may use computing device 102 to manage computing device 120, such as managing the installation of applications at computing device 120. For example, the user may interact with computing device 102 to remotely install a particular application at computing device 120.

For example, a user may interact with computing device 102 to select application 112 that is to be installed at computing device 120 and to cause computing device 102 to execute remote management module 108 to send, to computing device 120, a request to install application 112. The request may include an indication of the action to be performed by computing device 120, such as installation of application 112. The request may also include metadata that indicates application 112 that is to be installed by computing device 120, such as a package name of application 112.

Application 112 may be software that includes functionality to perform a variety of operations on computing device 120. For instance, application 112 may include a web browser, an email application, a text messaging application, an instant messaging application, a weather application, a video conferencing application, a social networking application, a weather application, a stock market application, an emergency alert application, a sports application, an office productivity application, a multimedia player, etc.

The request does not include a package of application 112 to be installed. That is, the request does not include executable code of application 112. Instead, the request generated by remote management module 108 is a control signal that instructs computing device 120 to install application 112. Thus, to perform the requested installation of application 112, computing device 120 may communicate with computing system 150 via network 130 to download application 112.

In some examples, computing device 102 may send the request to computing device 120 via network 130. For example, computing device 102 may send the request via network 130 to computing system 150, and computing system 150 may in turn forward the request via network 130 to computing device 120. In some examples, computing device 102 may establish short range wireless connection 118, also referred to herein as a direct connection, with the computing device 120, and may send the request to computing device 120 via short range wireless connection 118. Examples of short range wireless connection 118 include a Bluetooth® connection, a Bluetooth® Low Energy (BLE) connection, a Wi-Fi® Direct connection, an ultra wideband (UWB) connection, a near-field communication (NFC) connection, a Personal Area Network (PAN), and the like.

Computing device 120 may receive the request to install an application, such as a request to install application 112, sent by computing device 102. Computing device 120 may execute application install module 124 to, in response to receiving a request to install application 112, attempt to install application 112 at computing device 120. Computing device 120 may attempt to install application 112 by downloading the requested application 112 from computing system 150 and by installing application 112 at computing device 120.

For example, application install module 124 of computing device 120 may, in response to receiving a request to install application 112, send, to computing system 150, a request to download application 112. Application management module 132 of computing system 150 may receive the request to download application 112 and may, in response, retrieve application 112 from application repository 162 and send application 112 to computing device 120. Application install module 124 may, in response to downloading application 112 from computing system 150, install application 112 at computing device 120.

However, remote installation of applications may have many different points of failure. For example, a computing device may not have sufficient available storage space to install an application. Furthermore, if a computing device is offline for extended periods of time, the computing device may not receive requests to install applications sent to the computing device. In addition, a computing device having connectivity issues may have problems in successfully downloading applications to be installed at the computing device.

In accordance with aspects of this disclosure, to reduce failures in remote installation of applications due to computing devices being offline for extended periods of time, computing system 150 may queue requests to install applications received by computing system 150 if computing system 150 is unable to deliver the requests to intended recipients of the requests. In the example of FIG. 1, computing device 102 may send a request to install application 112 to computing device 120 by sending the request via network 130 to computing system 150. Application management module 132 of computing system 150 may, in response to computing system 150 receiving the request from computing device 102, attempt to forward the request via network 130 to computing device 120.

Application management module 132 may determine whether computing system 150 is able to successfully forward the request to computing device 120. If application management module 132 determines that computing system 150 is not able to successfully forward the request to computing device 120, such as if computing device 120 is offline (e.g., not connected to network 130), application management module 132 may queue the request at computing system 150.

Application install module 124 of computing device 120 may query computing system 150 for requests to install applications at computing device 220 that are queued by computing system 150. For example, if computing device 120 has been offline, computing device 120 may, after re-connecting to network 130, send, to computing system 150 via network 130, a query for requests to install applications at computing device 120 that are queued at computing system 150. Application install module 124 may, in response to receiving the query from computing device 120, send any requests to install applications at computing device 120 that are queued at computing system 150 to computing device 120 via network 130.

In accordance with aspects of this disclosure, to reduce failures in installing applications due to insufficient available storage space, a computing device that receives a request to install an application may determine whether the computing device has sufficient available storage space to install the application. The computing device may, in response to determining that the computing device does not have sufficient available storage space to install the application, install a stub associated with the application.

In the example of FIG. 1, computing device 120 may, in response to receiving the request to install application 112, execute application install module 124 to determine whether computing device 120 has sufficient available storage space to install application 112. Application install module 124 may determine the amount of available storage space at computing device 120 and the amount of storage space that is needed to install application 112, and may compare the amount of available storage space at computing device 120 with the amount of storage space that is needed to install application 112 to determine whether computing device 120 has sufficient available storage space to install application 112.

If application install module 124 determines that computing device 120 has sufficient available storage space to install application 112, application install module 124 may download application 112 from computing system 150 and install application 112 at computing device 120. If application install module 124 determines that computing device 120 does not have sufficient available storage space to install application 112, application install module 124 may install stub 119 associated with application 112.

A stub associated with an application may be one or more files, such as an applet or other program code, that acts as a placeholder for the application at computing device 120. A stub may have a relatively small size, such as by being less than 100 kilobytes or less than 1 megabyte in size. As such, even when computing device 120 has very little available storage space, computing device 120 may have sufficient storage space to install the stub associated with the application.

After computing device 120 has installed stub 119 associated with application 112, application install module 124 may, at a later point in time, attempt to download application 112 associated with stub 119. In some examples, application install module 124 may periodically determine whether computing device 120 has sufficient available storage space to install application 112. Application install module 124 may, in response to determining that computing device 120 has sufficient available storage space to install application 112, download application 112 from computing system 150 and install application 112 at computing device 120 in place of stub 119.

In some examples, after computing device 120 has installed stub 119 associated with application 112, computing device 120 may present an indication of stub 119 in a user interface as if application 112 has been installed at computing device 120, and may enable a user to interact with computing device 120 to launch stub 119. For example, after installing stub 119, computing device 120 may present an application icon associated with stub 119 on the desktop or on the home screen that is displayed by computing device 120. Such an application icon may be the same as the application icon of application 112 associated with stub 119.

In the example of FIG. 1, application install module 124 may send data to UI module 106 that causes UIC 104 to display user interface 114 that presents a home screen of computing device 120. The home screen may include application icons 116A-116E that are associated with applications installed at computing device 120. For example, application icon 116D may be an icon associated with a phone application, and the user may provide user input at UIC 104 to select application icon 116D to launch the phone application.

When application install module 124 downloads and installs stub 119 associated with application 112 at computing device 120, application install module 124 may update the home screen to include application icon 116F that is associated with stub 119, where application icon 116F may be the same application icon as the application icon for application 112 associated with stub 119. A user may provide user input at UIC 104 to open or launch stub 119 associated with application icon 116F, such as by selecting application icon 116F, double clicking application icon 116F, and the like.

UI module 106 may send, to application install module 124, an indication of user input that corresponds to opening or launching stub 119 associated with application icon 116F. Application install module 124 may, in response to receiving the indication of user input that corresponds to opening or launching stub 119 associated with application icon 116F, attempt to download application 112 associated with stub 119 from computing system 150 and install application 112 at computing device 120.

In accordance with aspects of this disclosure, to reduce failures in installing applications due to intermittent connectivity issues, a computing device that fails to successfully download an application from computing system 150 may retry downloading the application from computing system

150 at a later time. In the example of FIG. 1, application install module 124 may, in response to receiving a request to install application 112, attempt to install application 112 at computing device 120. Application install module 124 may send a request to computing system 150 to download application 112.

If application install module 124 fails to download application 112 from computing system 150, such as due to intermittent connectivity between computing device 120 and network 130, application install module 124 may detect such a temporary failure to download application 112. Application install module 124 may, in response to detecting a temporary failure to download application 112, schedule a retry to download and install application 112 after a specified time period (e.g., after 1 hour, after 1 day, etc.). In some examples, application install module 124 may periodically retry to download and install application 112, such as every hour, every day, and the like, until application install module 124 is able to successfully download application 112. In this way, application install module 124 may be able to overcome temporary failures in downloading applications from computing system 150.

The techniques of this disclosure provide one or more technical advantages. By queuing requests to install applications when a computing system is unable to forward those requests to the intended recipients of the requests, the techniques of this disclosure may reduce the number of times that the computing system fails to deliver requests to install applications to the intended recipients of the requests. This addresses an Internet-centric problem of computing devices that are not always online and connected to the Internet by enabling the computing system, when a recipient computing device is offline, to queue requests to the offline computing device that the recipient computing device may retrieve from the computing system when the computing device returns back online.

Further, by enabling a computing device to retry downloading of an application at a later time if the computing device fails to download the application, the computing device may enable the computing device to more gracefully handle intermittent connectivity issues that cause such a temporary failure to download an application. This addresses an Internet-centric problem of computing devices that may have intermittent Internet connectivity issues by enabling a computing device suffering from such connectivity issues to be able to retry downloading of applications when the computing device has more reliable internet connectivity.

In addition, by enabling a computing device to determine whether the computing device has sufficient storage space to install an application and to install a stub associated with the application if the computing device determines that it does not have sufficient storage space to install the application, the techniques of this disclosure may reduce failures in installing applications caused by insufficient storage space, which may address issues that are often encountered by mobile computing devices having limited storage space. By installing a stub associated with the application, the computing device may be able to, at a later point in time, install the application when the computing device has sufficient storage to install the application.

Using a single computing device to remotely install applications at multiple other computing devices may also reduce the amount of user interactions with these other computing devices. Reducing the amount of user interactions with these other computing devices may reduce the amount of processing cycles of these computing devices that are used to process user interactions and may also reduce battery usage of these computing devices.

In addition, by enabling a computing device to send requests to other computing devices to install applications only if the computing device is signed into the same user account as the other computing devices, the techniques of this disclosure improves the security of remote management of computing devices. For example, the techniques of this disclosure may prevent computing devices from fulfilling requests to install applications from unauthorized computing devices that are not signed into the same user account as the computing devices.

Figure 2:
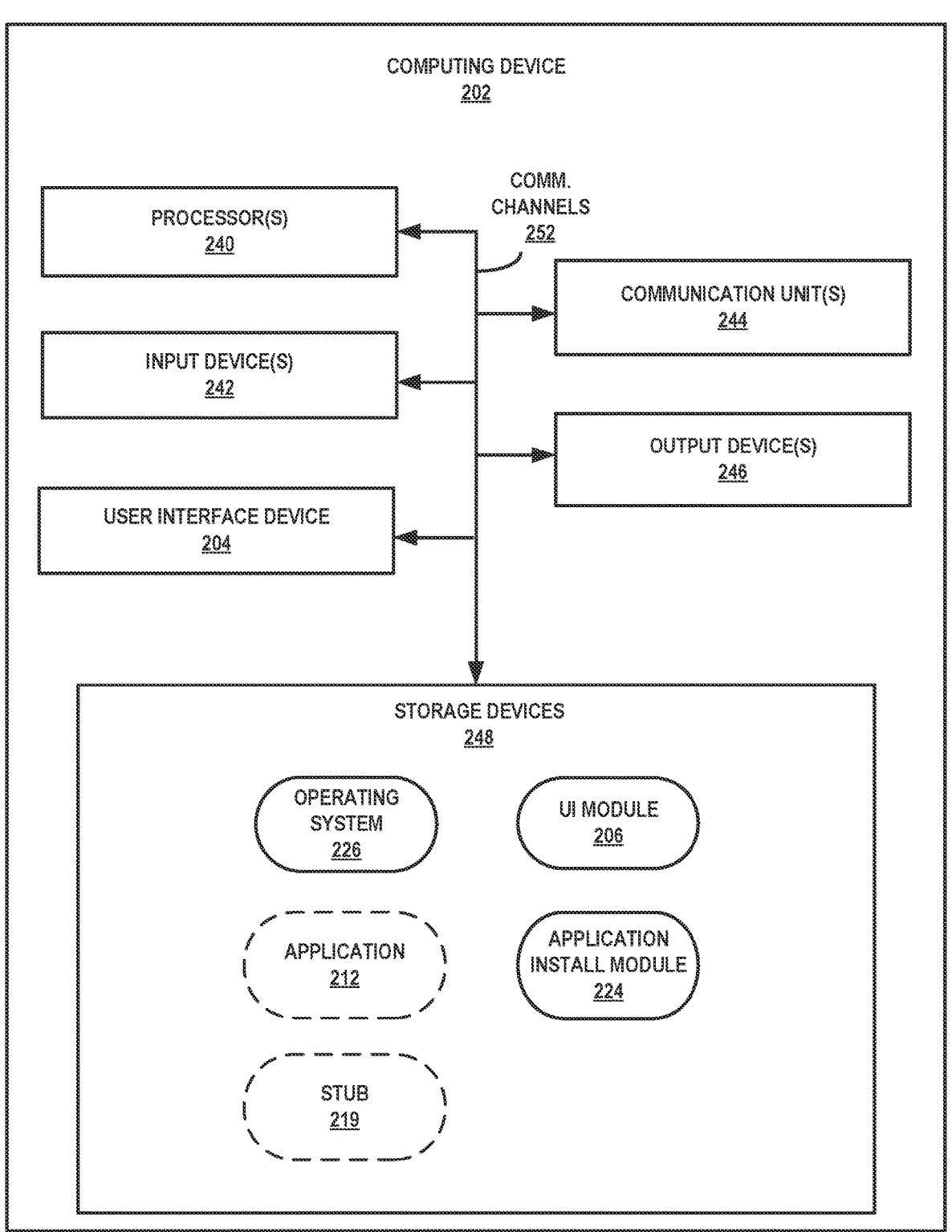
FIG. 2 is a block diagram illustrating an example computing device, in accordance with one or more aspects of the present disclosure.

FIG. 2 is a block diagram illustrating an example computing device, in accordance with one or more aspects of the present disclosure. FIG. 2 illustrates only one particular example of computing device 220, and many other examples of computing device 220 may be used in other instances and may include a subset of the components included in example computing device 220 or may include additional components not shown in FIG. 2. Computing device 220 may be an example of computing device 120 of FIG. 1.

As shown in the example of FIG. 2, computing device 220 includes user interface component 204 ("UIC 204"), one or more processors 240, one or more input devices 242, one or more communication units 244, one or more output devices 246, and one or more storage devices 248. Storage devices 248 of computing device 220 also include operating system 226, UI module 206, application install module 224, application 212, and stub 219. UI module 206 is an example of UI module 106 of FIG. 1, application install module 224 is an example of application install module 124 of FIG. 1, application 212 is an example of application 112 of FIG. 1, and stub 219 is an example of stub 119 of FIG. 1.

Communication channels 252 may interconnect each of the components 204, 240, 242, 244, 246, and 248 for inter-component communications (physically, communicatively, and/or operatively). In some examples, communication channels 252 may include a system bus, a network connection, one or more inter-process communication data structures, or any other components for communicating data between hardware and/or software.

One or more processors 240 may implement functionality and/or execute instructions within computing device 220. For example, one or more processors 240 on computing device 102 may receive and execute instructions stored by storage devices 248 that provide the functionality of operating system 226, UI module 206, application install module 224, application 212, and stub 219. These instructions executed by one or more processors 240 may cause computing device 220 to store and/or modify information, within storage devices 248 during program execution. One or more processors 240 may execute instructions of operating system 226, UI module 206, application install module 224, application 212, and stub 219. That is, operating system 226, UI module 206, application install module 224, application 212, and stub 219 may be operable by one or more processors 240 to perform various functions described herein.

One or more processors 240 may be or include a digital signal processor (DSP), a general purpose microprocessor, application specific integrated circuit (ASIC), field programmable logic array (FPGA), and/or other equivalent integrated or discrete logic circuitry. One or more input devices 242 of computing device 220 may be configured to receive input. Examples of input are tactile, audio, and video input. Input devices 242 of computing device 220, in one example, includes a presence-sensitive display, touch-sensitive screen, mouse, keyboard, voice responsive system, video camera, microphone or any other type of device for detecting input from a human or machine.

One or more output devices 246 of computing device 220 may be configured to generate output. Examples of output are tactile, audio, and video output. Output devices 246 of computing device 220, in one example, includes a presence-sensitive organic light emitting diode (OLED) display, sound card, video graphics adapter card, speaker, monitor, a presence-sensitive liquid crystal display (LCD), or any other type of device for generating output to a human or machine.

One or more communication units 244 of computing device 220 may communicate with external devices by transmitting and/or receiving data. For example, computing device 220 may use communication units 244 to transmit and/or receive radio signals on a radio network such as a cellular radio network. In some examples, communication units 244 may transmit and/or receive satellite signals on a satellite network such as a Global Positioning System (GPS) network. Examples of communication units 244 include a network interface card (e.g., such as an Ethernet card), an optical transceiver, a radio frequency transceiver, a GPS receiver, or any other type of device that can send and/or receive information. Other examples of communication units 44 may include Bluetooth®, BLE, UWB, NFC, GPS, 3G, 4G, and Wi-Fi® radios found in mobile devices as well as Universal Serial Bus (USB) controllers and the like.

UIC 204 is an example of UIC 104 of FIG. 1. In some examples, UIC 204 of computing device 220 may include functionality of input devices 242 and/or output devices 246. In the example of FIG. 2, UIC 204 may be or may include a presence-sensitive input device, such as a presence-sensitive display (e.g., a touchscreen). In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, a presence sensitive input device also provides output to a user using tactile, audio, or video stimuli as described with respect to one or more output devices 246, e.g., at a display. In the example of FIG. 2, UIC 204 may present a user interface.

While illustrated as an internal component of computing device 220, UIC 204 also represents an external component that shares a data path with computing device 220 for transmitting and/or receiving input and output. For instance, in one example, UIC 204 represents a built-in component of computing device 220 located within and physically connected to the external packaging of computing device 220 (e.g., a screen on a mobile phone). In another example, UIC 204 represents an external component of computing device 220 located outside and physically separated from the packaging of computing device 220 (e.g., a monitor, a projector, etc. that shares a wired and/or wireless data path with a tablet computer).

One or more storage devices 248 within computing device 220 may store information for processing during operation of computing device 220. In some examples, storage device 248 is a temporary memory, meaning that a primary purpose of storage device 248 is not long-term storage. Storage devices 248 on computing device 220 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 248, in some examples, also include one or more computer-readable storage media. Storage devices 248 may be configured to store larger amounts of information than volatile memory. Storage devices 248 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 248 may store program instructions and/or data associated with operating system 226, UI module 206, application install module 224, application 212, and stub 219.

In accordance with techniques of the disclosure, one or more processors 240 of computing device 220 are configured to execute application install module 224 to receive a request, sent by a computing device such as computing device 102 signed into a same user account as computing device 220, for computing device 220 to install an application, such as application 212. In some examples, application install module 224 may receive the request via one or more communication units 244 from a computing system, such as computing system 150, that forwards the request from computing device 102 via network 130 to computing device 220. In some examples, application install module 224 may receive the request via one or more communication units 244 from computing device 102 over a short range wireless connection, such as short range wireless connection 118, between computing device 102 and computing device 220.

In some examples, if computing system 150 is not able to forward requests to install applications sent by other computing devices to computing device 220, such as when computing device 220 is offline or otherwise not connected to network 130, computing system 150 may queue such requests. Application install module 224 may, after computing device 220 is back online, send, via one or more communication units 244 to computing system 150, a query for requests to install applications at computing device 220 that are queued by computing system 150. One or more communication units 244 may, in response to sending the query to computing system 150, receive, via one or more communication units 244 and from computing system 150, one or more requests for computing device 220 to install one or more applications.

One or more processors 240 are configured to execute application install module 224 to, in response to receiving the request to install application 212, parse the request. The request may include an indication of the action to be performed by computing device 220, such as installation of application 212. The request may also include metadata that indicates the application that is to be installed by computing device 220, such as a package name of application 212. By parsing the request, application install module 224 may be able to determine that the request is a request for computing device 220 to download a particular application 212 specified by the request. Application install module 224 may therefore attempt to download application 212 specified by the request from computing system 150 and to install the downloaded application 212.

In some examples, prior to attempting to download and install application 212, application install module 224 may authenticate the request as being sent by a computing device signed into the same user account as computing device 220 and to verify the request as being intended for computing device 220. The request may include information that may enable computing device 220 to authenticate the request as being sent by a computing device signed into the same user account as computing device 220 and to verify the request as being intended for computing device 220. For example, the request may include an indication of the computing device sending the request, such as by including a device identifier associated with computing device 102, and an indication of the computing device that is the intended recipient of the request, such as by including a device identifier associated with computing device 220.

If the request includes an indication of the sender of the request, such as a device identifier associated with the sender of the, application install module 224 may determine whether the device identifier associated with the sender of the request matches a device identifier of a computing device signed into the user account to authenticate the request as being sent by a computing device signed into the same user account as computing device 220. Similarly, if the request includes an indication of the intended recipient of the request, such as a device identifier associated with the recipient of the request, application install module 224 may determine whether the device identifier associated with the recipient of the request matches the device identifier of computing device 220 to verify the request as being intended for computing device 220.

In some examples, if the request is encrypted or digitally signed using a cryptographic key that is shared by devices (e.g., computing devices 102 and 220) signed into the same user account, application install module 224 may use the shared cryptographic key to authenticate the request as being sent by a computing device signed into the same user account as computing device 220 and to verify the request as being intended for computing device 220, such as by decrypting the request using the shared cryptographic key or by using the shared cryptographic key to verify the digital signature.

Application install module 224 may therefore, in response to successfully authenticating the request as being sent by a computing device signed into the same user account as computing device 220 and in response to successfully verifying the request as being intended for computing device 220, attempt to download and install application 212 specified by the request. In some examples, application install module 224 may attempt to download and install application 212 without authenticating the request as being sent by a computing device signed into the same user account as computing device 220 and without successfully verifying the request as being intended for computing device 220.

In some examples, one or more processors 240 are configured to execute application install module 224 to determine whether storage devices 248 of computing device 220 has sufficient available storage space to install application 212 specified by the request. If application install module 224 determines that storage devices 248 of computing device 220 has sufficient available storage space to install application 212, application install module 224 may download and install application 212. If application install module 224 determines that storage devices 248 of computing device 220 does not have sufficient available storage space to install application 212, application install module 224 may download and install stub 219 associated with application 212.

In some examples, application install module 224 may query computing system 150 regarding the amount of storage space that may be required to install application 212 and may, in response, receive, from computing system 150, an indication of the amount of storage space that may be required to install application 212. Application install module 224 may determine, based on the amount of storage space that may be required to install application 212, whether storage devices 248 of computing device 220 has sufficient available storage space to install application 212.

For example, application install module 224 may compare the amount of available storage space (e.g., the amount of unused storage space) of storage devices 248 with the amount of storage space that may be required to install application 212. If application install module 224 determines that the amount of available storage space of storage devices 248 is greater than or equal to the amount of storage space required to install application 212, application install module 224 may determine that storage devices 248 has sufficient available storage space to install application 212. Similarly, if application install module 224 determines that the amount of available storage space of storage devices 248 is less than the amount of storage space required to install application 212, application install module 224 may determine that storage devices 248 does not have sufficient available storage space to install application 212.

If application install module 224 determines that storage devices 248 does not have sufficient available storage space to install application 212, application install module 224 may send, via one or more communication units 244 to computing system 150, a request to download stub 219 associated with application 212.

Application install module 224 may therefore download, via one or more communication units 244 and from computing system 150, stub 219 associated with application 212. After application install module 224 has downloaded stub 219 associated with application 212, application install module 224 may install stub 219 associated with application 212 at computing device 220. Stub 219 associated with application 212 may be one or more files, such as an applet or other program code, that acts as a placeholder for application 212 at computing device 220. A stub, such as stub 219, may have a relatively small size, such as by being less than 100 kilobytes or less than 1 megabyte in size. As such, even when storage devices 248 has very little available storage space, storage devices 248 may have sufficient storage space to install stub 219 associated with application 212

If application install module 224 determines that storage devices 248 has sufficient available storage space to install application 212, application install module 224 may send, via one or more communication units 244 to computing system 150, a request to download application 212. Application install module 224 may therefore download, via one or more communication units 244 and from computing system 150, application 212. After application install module 224 has downloaded application 212, application install module 224 may install application 212 at computing device 220. In some examples, application install module 224 may download application 212 without determining whether storage devices 248 has sufficient available storage space to install application 212.

In some examples, after installing stub 219 associated with application 212, application install module 224 may monitor the available storage space of storage devices 248 to determine whether storage devices 248 has sufficient available storage space to install application 212. For example, application install module 224 may periodically determine whether storage devices 248 has sufficient available storage space to install application 212 by comparing the amount of available storage space at storage devices 248 to the amount of storage space required to install application 212. If application install module 224 determines that storage devices 248 has sufficient available storage space to install application 212, application install module 224 may download application 212 from computing system 150 and may install application 212 at computing device 220 in place of stub 219.

In some examples, application install module 224 may, in response to installing stub 219, include an application icon associated with stub 219 in a home screen or desktop of computing device 220 that is displayed at UIC 204. A user may provide user input at UIC 204 to open or launch stub 219, such as by selecting or double clicking the application icon associated with stub 219. UI module 206 may, in response to the user providing user input to open or launch stub 219, send, to application install module 224, an indication of user input that corresponds to opening or launching stub 219 associated with the application icon. Application install module 224 may, in response to receiving the indication of user input that corresponds to opening or launching stub 219 associated with the application icon, attempt to download application 212 associated with stub 219 from computing system 150 and to install application 212 at computing device 220 in place of stub 219.

In some examples, if application install module 224 determines, while attempting to download application 212 associated with stub 219, that storage devices 248 still has insufficient available storage space to install application 212, application install module 224 may cause UIC 204 to display a prompt for the user of computing device 220 to perform one or more storage space-saving actions, such as turning on an auto archiving feature to archive unused applications at computing device 220. The auto archive feature may archive applications that have not been used recently, such as applications that have not been used in the last 30 days, such as by deleting certain data associated with those unused applications from storage devices 248.

In some examples, application install module 224 may fail to successfully download an application from computing system 150. For example, one or more communication units 244 of computing device 220 may encounter intermittent connectivity issues that prevent computing device 220 from being connected to network 130 long enough to successfully download application 212 from computing system 150. If application install module 224 fails to successfully download application 212 from computing system 150, application install module 224 may schedule downloading of application 212 for a later time, such as one hour later, one day later, and the like. If application install module 224 fails again to download application 212 from computing system 150 at the scheduled later time, application install module 224 may continue to periodically try to download application 212, such as by trying to download the application 212 every hour, every day, and the like. In some examples, application install module 224 may be able to detect that computing device 220 has a stable connection to network 130 and may, in response, attempt to download application 212 from computing system 150.

Figure 3:
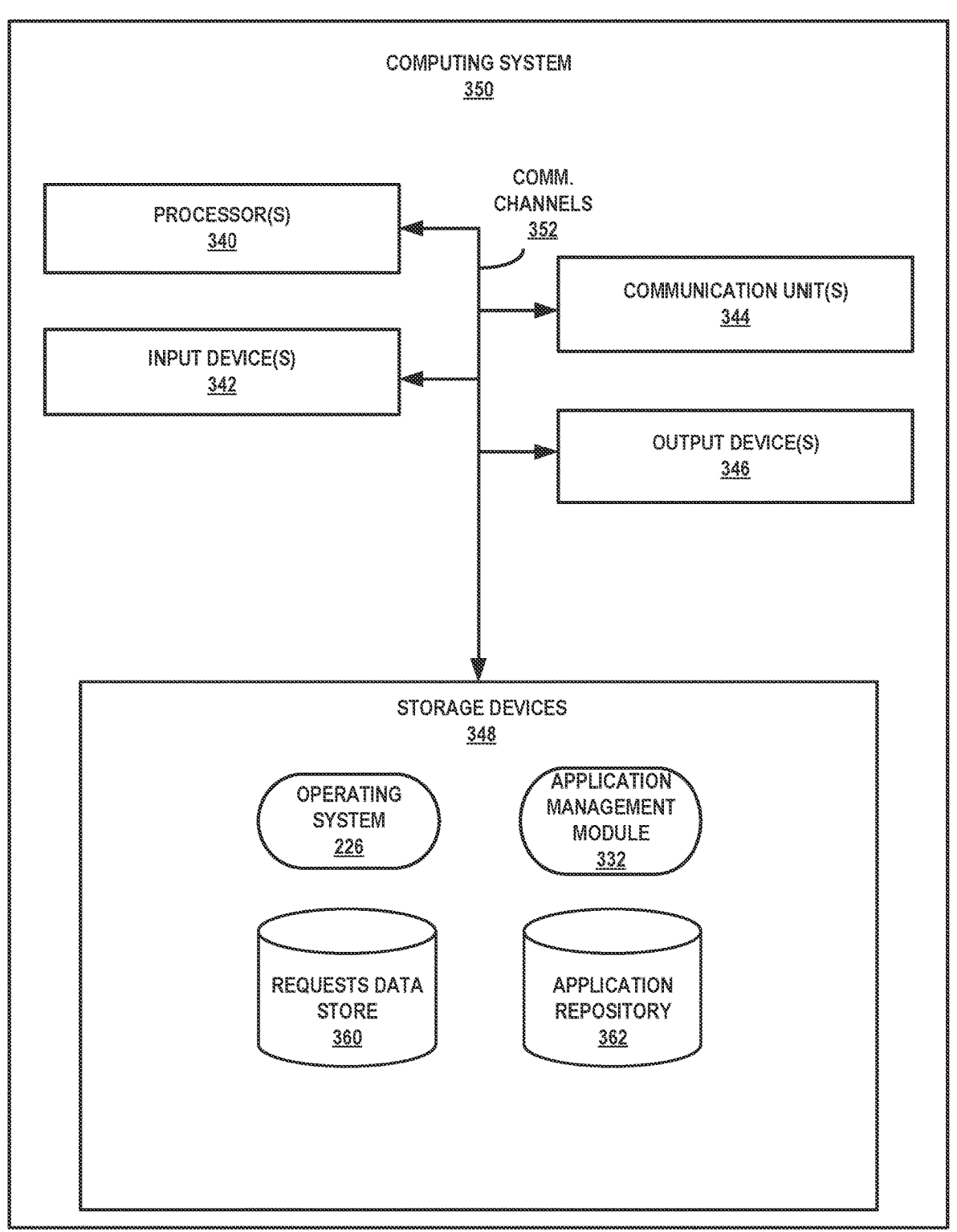
FIG. 3 is a block diagram illustrating an example computing system, in accordance with one or more aspects of the present disclosure.

FIG. 3 is a block diagram illustrating an example computing system, in accordance with one or more aspects of the present disclosure. FIG. 3 illustrates only one particular example of computing system 350, and many other examples of computing system 350 may be used in other instances and may include a subset of the components included in example computing system 350 or may include additional components not shown in FIG. 3. Computing system 350 may be an example of computing system 150 of FIG. 1.

As shown in the example of FIG. 3, computing system 350 includes one or more processors 340, one or more input devices 342, one or more communication units 344, one or more output devices 346, and one or more storage devices 348. Storage devices 348 of computing system 350 also include operating system 326, application management module 332, requests data store 360, and application repository 362. Application management module 332 is an example of application management module 132 of FIG. 1, and application repository 362 is an example of application repository 162 of FIG. 1.

Communication channels 352 may interconnect each of the components 340, 342, 344, 346, and 348 for inter-component communications (physically, communicatively, and/or operatively). In some examples, communication channels 352 may include a system bus, a network connection, one or more inter-process communication data structures, or any other components for communicating data between hardware and/or software.

One or more processors 340 may implement functionality and/or execute instructions within computing system 350. For example, processors 340 on computing system 350 may receive and execute instructions stored by storage devices 348 that provide the functionality of operating system 326 and application management module 332. These instructions executed by processors 340 may cause computing system 350 to store and/or modify information, within storage devices 348 during program execution. Processors 340 may execute instructions of operating system 326 and application management module 332. That is, operating system 326 and application management module 332 may be operable by processors 240 to perform various functions described herein.

One or more processors 340 may be or include a digital signal processor (DSP), a general purpose microprocessor, application specific integrated circuit (ASIC), field programmable logic array (FPGA), and/or any other equivalent integrated or discrete logic circuitry. One or more input devices 342 of computing system 350 may receive input. Examples of input are tactile, audio, kinetic, and optical input, to name only a few examples. One or more output devices 346 of computing system 350 may generate output. Examples of output are tactile, audio, and video output.

One or more communication units 344 of computing system 350 may communicate with external devices by transmitting and/or receiving data. For example, computing system 350 may use communication units 344 to transmit and/or receive radio signals on a radio network such as a cellular radio network. In some examples, communication units 344 may transmit and/or receive satellite signals on a satellite network such as a Global Positioning System (GPS) network. Examples of communication units 344 include a network interface card (e.g., such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers and the like.

One or more storage devices 348 within computing system 350 may store information for processing during operation of computing system 350. In some examples, storage device 348 is a temporary memory, meaning that a primary purpose of storage device 348 is not long-term storage. Storage devices 348 on computing system 350 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 348, in some examples, also include one or more computer-readable storage media. Storage devices 348 may be configured to store larger amounts of information than volatile memory. Storage devices 348 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 348 may store program instructions and/or data associated with operating system 326 and application management module 332.

In accordance with techniques of the disclosure, one or more processors 340 of computing system 350 are configured to execute application management module 332 to receive, from a first computing device, such as computing device 102, a request for a second computing device, such as computing device 120, to install an application. For example, application management module 332 may receive, from computing device 102 and via communication units 344, a request for computing device 120 to install an application, and application management module 332 may forward the request to computing device 120 via network 130.

If computing system 350 is unable to forward the request to computing device 120, such as when computing device 120 is offline or otherwise unreachable via network 130, application management module 332 may queue the request at computing system 350, such as in requests data store 360. When application management module 332 receives, via communication units 344, a query from computing device 120 queued requests to install applications, application management module 332 may retrieve the request from requests data store 360 and may forward the request to computing device 120 via network 130.

In some examples, application management module 332 may use communication units 344 to periodically attempt to send queued requests to the intended recipients of the requests via network 130. For example, if computing system 350 is unable to forward a request to computing device 120 and has therefore queued the request in requests data store 360, application management module 332 may periodically attempt to send the request to computing device 120, such as by attempting to send the request to computing device 120 once an hour, once a day, and the like.

One or more processors 340 are also configured to execute application management module 332 to receive, using communication units 344, a request to download an application from a computing device and to, in response, send the application to the computing device. For example, application management module 332 may receive, using communication units 344 and via network 130, a request from computing device 120 to download an application. Application management module 332 may, in response to receiving the request, retrieve the requested application from application repository 362, such as by retrieving an application package for the requested application from application repository 362, and may send, using communication units 344, the application to computing device 120 via network 130.

In some examples, application management module 332 may receive a request to download a stub associated with an application. For example, application management module 332 may receive, using communication units 344 and via network 130, a request from computing device 120 to download a stub associated with a particular application. Application management module 332 may, in response to receiving the request, retrieve the requested stub associated with the particular application from application repository 362 and may send, using communication units 344, the stub associated with the particular application to computing device 120 via network 130.

In some examples, application management module 332 may, in response to receiving a request from a computing device to download a particular application, determine whether the computing device has sufficient available storage space to install the application. For example, application management module 332 may receive, from computing device 120, a request to download a particular application, where the request may indicate the amount of available storage space (e.g., free storage space) at computing device 120. Application management module 332 may, in response to receiving the request from computing device 120, determine whether computing device 120 has sufficient available storage space to install the requested application.

In some examples, computing system 350 may store information regarding the amount of storage space that may be required to install each of the applications stored in application repository 362, and application management module 332 may use such information to determine the amount of storage space that may be required to install the requested application. Application management module 332 may therefore compare the amount of storage space that may be required to install the requested application with the amount of available storage space at computing device 120 to determine whether computing device 120 has sufficient available storage space to install the requested application.

For example, application management module 332 may determine that computing device 120 has sufficient available storage space to install the requested application if the amount of storage space that may be required to install the requested application is less than or equal to the amount of available storage space at computing device 120. Similarly, application management module 332 may determine that computing device 120 does not have sufficient available storage space to install the requested application if the amount of storage space that may be required to install the requested application is greater than the amount of available storage space at computing device 120.

If application management module 332 determines that computing device 120 has sufficient available storage space to install the requested application, application management module 332 may send, using communication units 344, the requested application to computing device 120 via network 130. Similarly, if application management module 332 determines that computing device 120 does not have sufficient available storage space to install the requested application, application management module 332 may send, using communication units 344, a stub associated with the requested application to computing device 120 via network 130.

Figure 4:
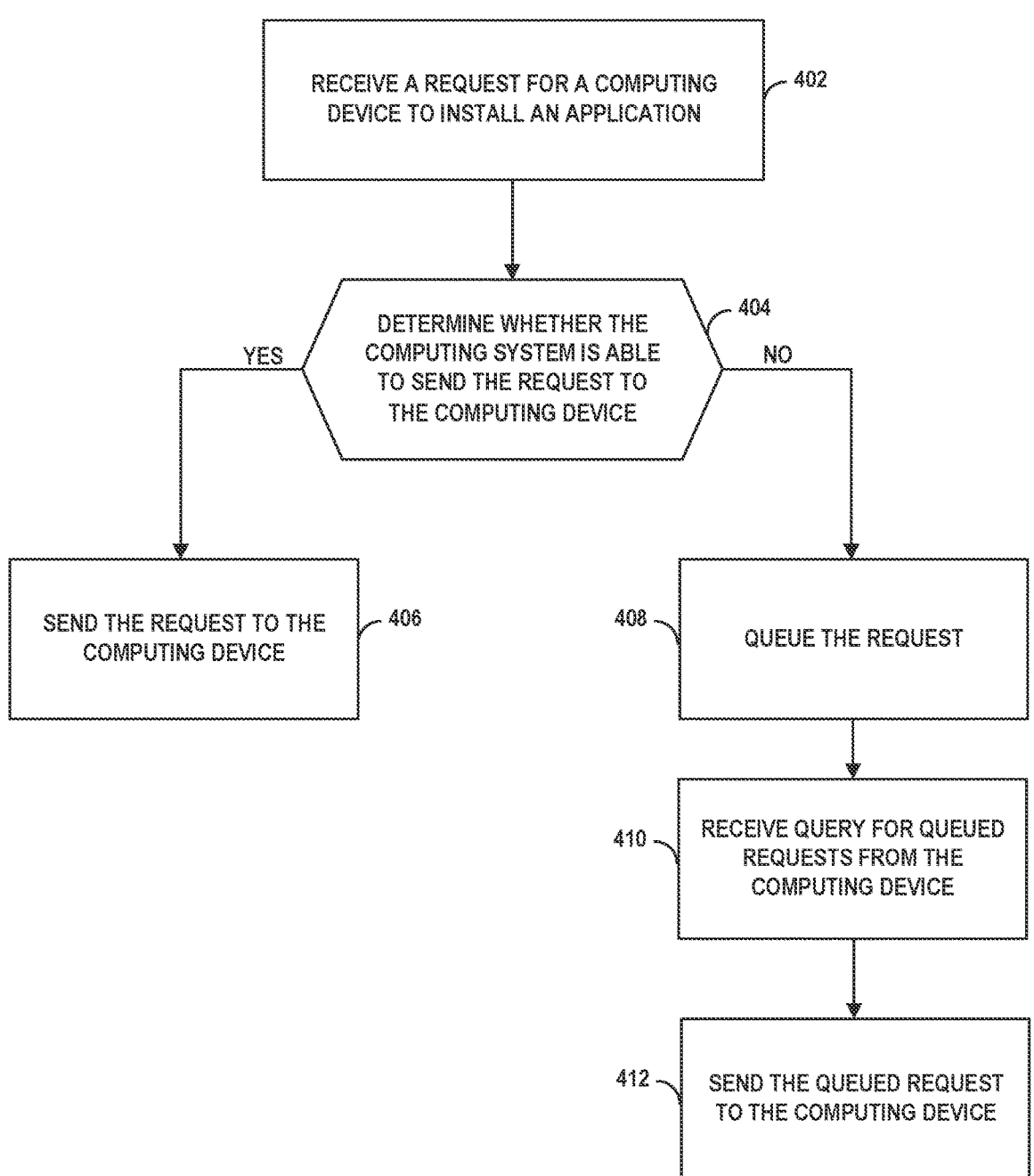
FIG. 4 is a flowchart illustrating a process for fault tolerant forwarding of a request to install an application, in accordance with one or more techniques of the present disclosure.

FIG. 4 is a flowchart illustrating a process for fault tolerant forwarding of a request to install an application, in accordance with one or more techniques of the present disclosure. FIG. 4 is described below in the context of FIGS. 1-3

As shown in FIG. 4, computing system 150 may receive, from computing device 102, a request for computing device 120 to install an application (402). Computing system 150 may, in response to receiving the request from computing device 102, determine whether computing system 150 is able to send the request to computing device 120 via network 130 (404). For example, computing system 150 may determine whether computing device 120 is online and able to receive communications from computing system 150 via network 130.

Computing system 150 may, in response to determining that computing system 150 is able to send the request to computing device 120 (YES at 404), send the request to computing device 120 (406). Computing system 150 may, in response to determining that computing system 150 is not able to send the request to computing device 120 (NO at 404), such as when computing device 120 is unreachable via network 130, queue the request at computing system 150 (408).

After queuing the request, computing system 150 may subsequently receive, from computing device 120, a query for queued requests to install applications at computing device 120 (410). Computing system 150 may, in response to receiving the query from computing device 120, send the queued request to computing device 120 (412).

Figure 5:
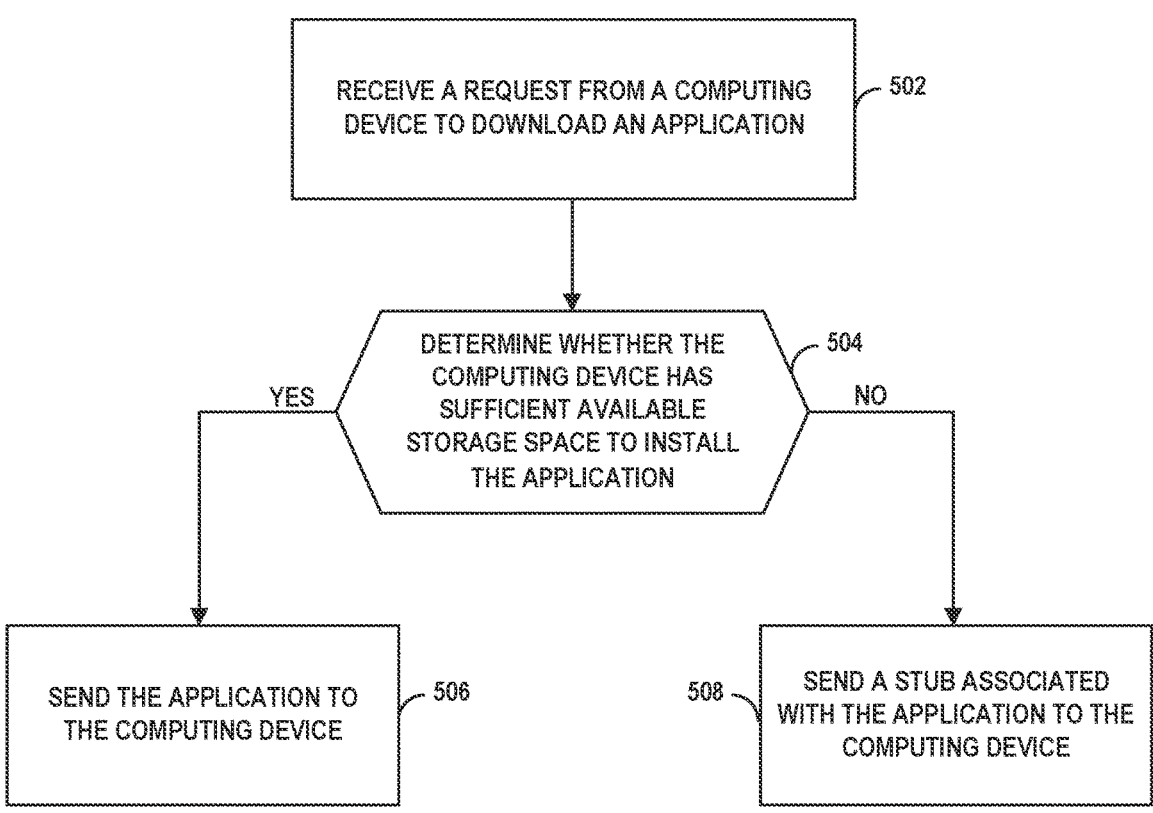
FIG. 5 is a flowchart illustrating a process for fault-tolerant installation of an application, in accordance with one or more techniques of the present disclosure.

FIG. 5 is a flowchart illustrating a process for fault-tolerant installation of an application, in accordance with one or more techniques of the present disclosure. FIG. 5 is described below in the context of FIGS. 1-3

As shown in FIG. 5, computing system 150 may receive a request from computing device 120 to download an application for installation at computing device 120 (502). Computing system 150 may, in response to receiving the request, determine whether computing device 120 has sufficient available storage space to install the application (504). For example, the request may indicate the amount of available storage space at computing device 120, or computing system 150 may have previously determined the amount of available storage space at computing device 120. Computing system 150 may therefore compare the amount of available storage space at computing device 120 with the amount of storage space that is required to install the requested application to determine whether computing device 120 has sufficient available storage space to install the application.

Computing system 150 may, in response to determining that computing device 120 has sufficient available storage space to install the requested application (YES at 504), send the requested application to computing device 120 for installation at computing device 120 (506). Computing system 150 may, in response to determining that computing device 120 does not have sufficient available storage space to install the requested application (NO at 504), send a stub associated with the requested application to computing device 120 for installation at computing device 120 (508).

Figure 6:
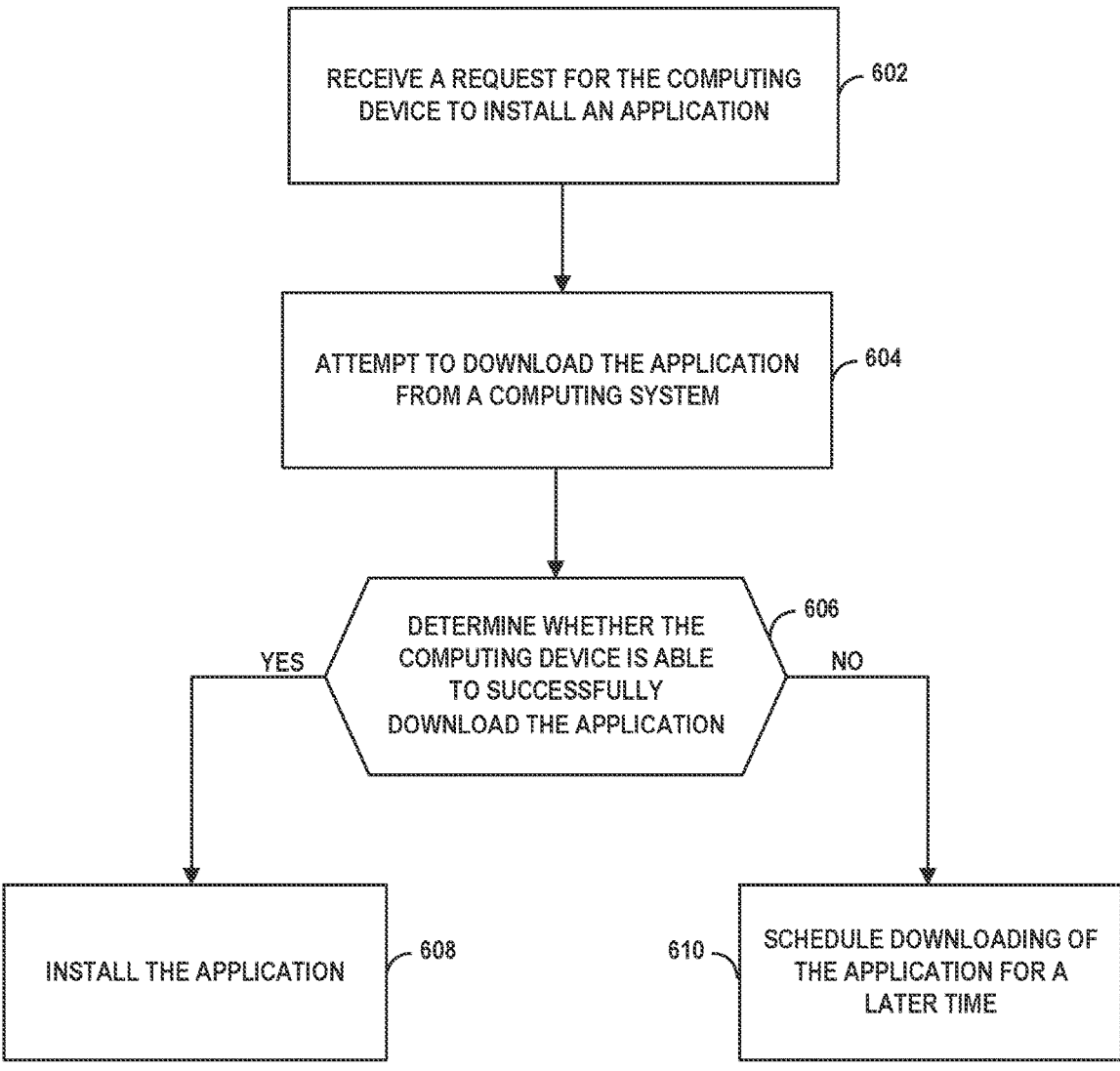
FIG. 6 is a flowchart illustrating a process for fault-tolerant downloading of an application, in accordance with one or more techniques of the present disclosure.

FIG. 6 is a flowchart illustrating a process for fault-tolerant downloading of an application, in accordance with one or more techniques of the present disclosure. FIG. 6 is described below in the context of FIGS. 1-3

As shown in FIG. 6, computing device 120 may receive a request to install an application that is sent by computing device 102 (602). Computing device 120 may, in response to receiving the request, attempt to download the application from computing system 150 (604). For example, computing device 120 may attempt to communicate with and establish a connection with computing system 150 over network 130 to download the application.

Computing device 120 may determine whether computing device 120 is able to successfully download the application from computing system 150 (606). For example, computing device 120 may determine whether computing device 120 is able to fully download the application package of the application. Network connectivity issues, such as intermittent connectivity with network 130 may cause computing device 120 to fail to successfully download the application from computing system 150.

Computing device 120 may, in response to determining that computing device is able to successfully download the application (YES at 606), schedule downloading of the application for a later time (608). Computing device 120 may, in response to determining that computing device is not able to successfully download the application (NO at 606), install the application at computing device 120, such as in an hour, in a day, etc. (610).

Figure 7:
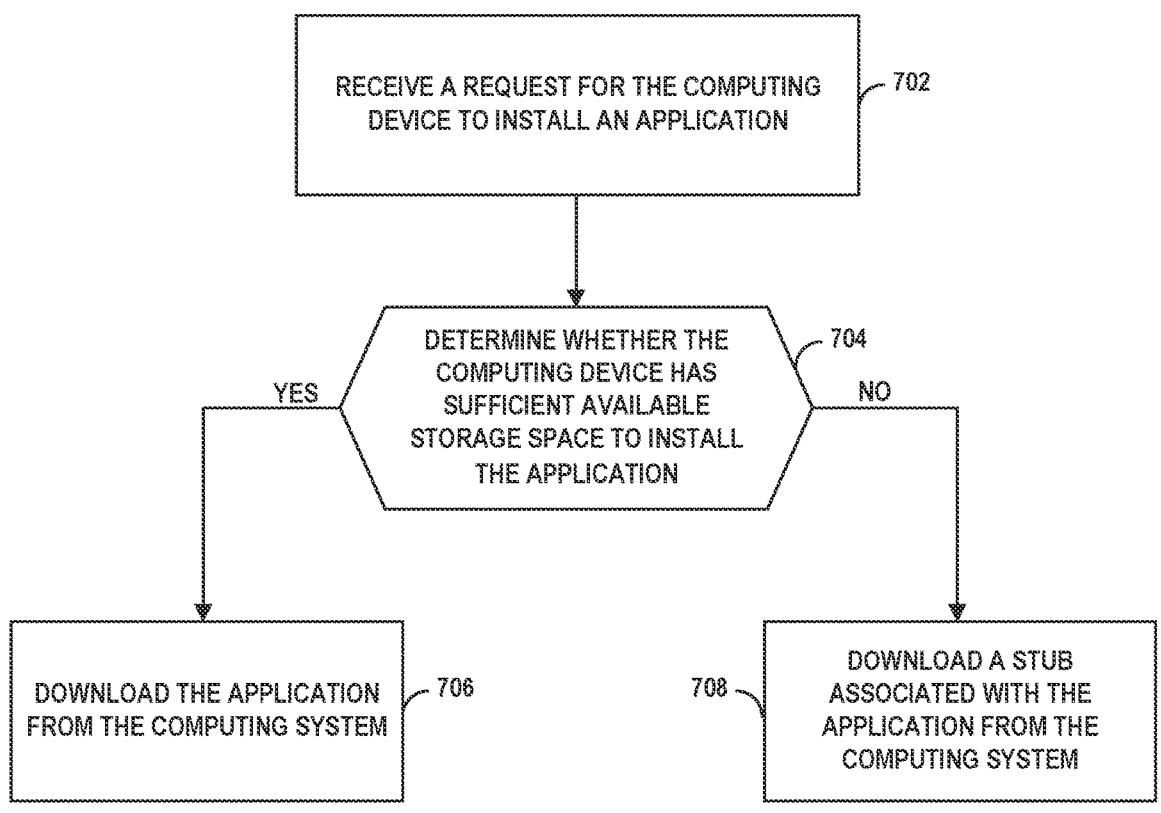
FIG. 7 is a flowchart illustrating a process for fault-tolerant installation of an application, in accordance with one or more techniques of the present disclosure.

FIG. 7 is a flowchart illustrating a process for fault-tolerant installation of an application, in accordance with one or more techniques of the present disclosure. FIG. 7 is described below in the context of FIGS. 1-3

As shown in FIG. 7, computing device 120 may receive a request to install an application that is sent by computing device 102 (702). Computing device 120 may, in response to receiving the request, determine whether computing device 120 has sufficient available storage space to install the application (704). For example, computing device 120 may receive, from computing system 150, an indication of the amount of storage space required to install the application, and computing device 120 may compare the amount of storage space required to install the application with the amount of available storage space at computing device 120 to determine whether computing device 120 has sufficient available storage space to install the application.

Computing device 120 may, in response to determining that computing device 120 has sufficient available storage space to install the application (YES at 704), download the application from computing system 150 (706). Computing device 120 may, in response to determining that computing device 120 does not have sufficient available storage space to install the application (NO at 704), download a stub associated with the application from computing system 150 (708).

FIG. 8 is a flowchart illustrating an example mode of operation for a computing device to perform fault tolerant application installs, in accordance with one or more techniques of the present disclosure. FIG. 8 is described below in the context of FIGS. 1-7.

As shown in FIG. 8, one or more processors 240 of computing device 220 may receive a request to install an application 212 at the computing device 220, wherein the request is sent by a second computing device 102 signed into the same user account as the computing device 220 (802). In some examples, to receive the request to install the application 212 at the computing device 220, one or more processors 240 may query the computing system 150 for queued requests to install application 212s at the computing device 220 and may, in response to querying the computing system 150, receive, from the computing system 150, the request to install the application 212. In some examples, to receive the request to install the application 212 at the computing device 220, one or more processors 240 may receive, via a direct wireless connection 118 between the computing device 220 and the second computing device 102, the request to install the application 212 from the second computing device 102.

One or more processors 240 may, in response to receiving the request and based on the computing device 220 not having sufficient available storage space to install the application 212, download a stub 219 associated with the application 212 from a computing system 150 (804). In some examples, one or more processors 240 may determine that the computing device 220 does not have sufficient available storage space to install the application 212 and may, in response to determining that the computing device 220 does not have sufficient available storage space to install the application 212, download the stub 219 associated with the application 212 from the computing system 150.

In some examples, to download the stub 219 associated with the application 212, one or more processors 240 may authenticate that the request is sent by the second computing device 102 signed into the same user account as the computing device 220, verify the request as being intended for the computing device 220, and, in response to successfully authenticating that the request is sent by the second computing device 102 signed into the same user account as the computing device 220 and successfully verifying the request as being intended for the computing device 220, download the stub 219 associated with the application 212 from the computing system 150.

One or more processors 240 may install the stub 219 associated with the application 212 (806). In some examples, one or more processors 240 may, after installing the stub 219 associated with the application 212, re-attempt to install the application 212. In some examples, to re-attempt to install the application 212, one or more processors 240 may, based on the computing device 220 having sufficient available storage space to install the application 212, download the application 212 from the computing system 150 and may install the application 212.

In some examples, to download the application 212 from the computing system 150, one or more processors 240 may determine that the computing device 220 is unable to successfully download the application 212 from the computing system 150 and may, in response to determining that the computing device 220 is unable to successfully download the application 212 from the computing system 150, schedule downloading of the application 212 at a later time.

In some examples, to re-attempt to install the application 212, one or more processors 240 may receive an indication of user input that corresponds to launching the stub 219 associated with the application 212 and may, in response to receiving the indication of the user input that corresponds to launching the stub 219 associated with the application 212, re-attempt to install the application 212.

Figure 9:
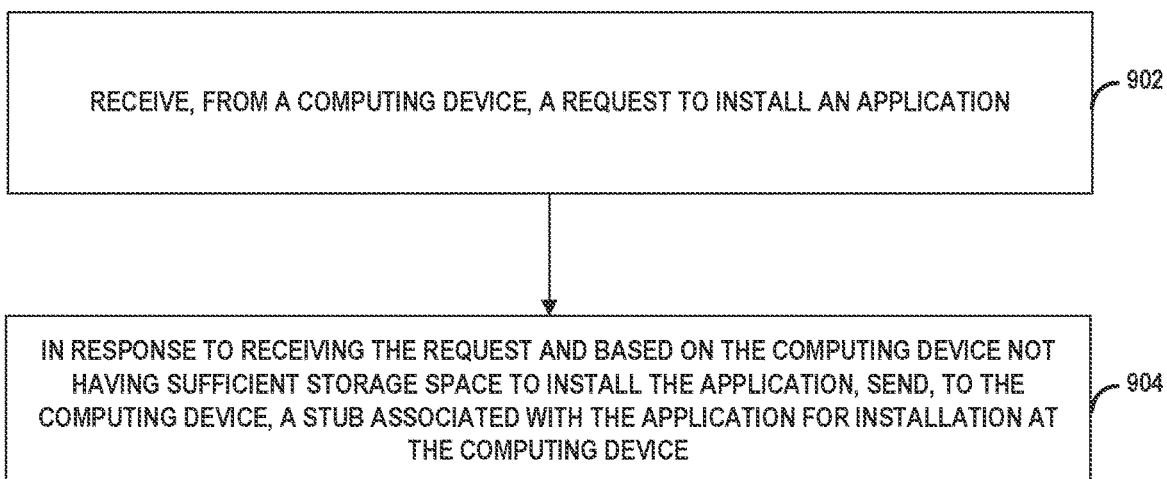
FIG. 9 is a flowchart illustrating an example mode of operation for a computing system to perform fault tolerant application installs, in accordance with one or more techniques of the present disclosure.

FIG. 9 is a flowchart illustrating an example mode of operation for a computing system to perform fault tolerant application installs, in accordance with one or more techniques of the present disclosure. FIG. 9 is described below in the context of FIGS. 1-7.

As shown in FIG. 9, one or more processors 340 of computing system 350 may receive, from a computing device 120, a request to download an application (902).

One or more processors 340 may, in response to receiving the request and based on the computing device 120 not having sufficient available storage space to install the application 112, send, to the computing device 120, a stub 119 associated with the application 112 for installation at the computing device 120 (904). In some examples, one or more processors 340 may determine that the computing device 120 does not have sufficient available storage space to install the application 112 and may, in response to determining that the computing device 120 does not have sufficient available storage space to install the application 112, send, to the computing device 120, the stub 119 associated with the application 112 for installation at the computing device 120.

In some examples, one or more processors 340 may receive, from the computing device 120, a subsequent request to download the application 112. One or more processors 340 may, in response to receiving the subsequent request, determine that the computing device 120 does have sufficient available storage space to install the application 112. One or more processors 340 may, in response to determining that the computing device 120 does have sufficient available storage space to install the application 112, send, to the computing device 120, the application 112 for installation at the computing device 120.

In some examples, to send, to the computing device 120, the application 112 for installation at the computing device 120, one or more processors 340 may determine that the computing device 120 is unable to successfully download the application 112 from the computing system 350. One or more processors 340 may, in response to determining that the computing device 120 is unable to successfully download the application 112 from the computing system 350, schedule sending of the application 112 to the computing device 120 at a later time.

In some examples, one or more processors 340 may receive, from a second computing device 102 signed into a same user account as the computing device 120, a request for the computing device 120 to install the application 112, and one or more processors 340 may forward the request to the computing device 120. In some examples, to forward, to the computing device 120, the request for the computing device 120 to install the application 112, one or more processors 340 may determine that the computing system 350 is unable to forward the request to the computing device 120. One or more processors 340 may, in response to determining that the computing system 350 is unable to forward the request to the computing device 120, queue the request at the computing system 350. One or more processors 340 may, after queuing the request, receive, from the computing device 120, a query for queued requests to install application 112s at the computing device 120. One or more processors 340 may, in response to receiving the query, forward the queued request to the computing device 120.

In some examples, one or more processors 340 may receive, from a second computing device 102 signed into the same user account as the computing device 120, a second request for the computing device 120 to install a second application. One or more processors 340 may determine that the computing system 350 is unable to forward the second request to the computing device 120. One or more processors 340 may, in response to determining that the computing system 350 is unable to forward the second request to the computing device 120, queue the second request at the computing system 350. One or more processors 340 may determine that the queued second request has not been forwarded to the computing device 120 for a specified time period. One or more processors 340 may, in response to determining that the queued second request has not been forwarded to the computing device 120 for the specified time period, send, to the second computing device 102, an indication that the second request has failed.

This disclosure includes the following examples.

Example 1. A method comprising: receiving, by one or more processors of a first computing device, a request to install an application at the first computing device, wherein the request is sent by a second computing device signed into a same user account as the first computing device; in response to receiving the request and based on the first computing device not having sufficient available storage space to install the application, downloading, by the one or more processors, a stub associated with the application from a computing system, and installing, by the first computing device, the stub associated with the application.

Example 2. The method of example 1, further comprising: after installing the stub associated with the application, re-attempting, by the one or more processors, to install the application.

Example 3. The method of example 2, wherein re-attempting to install the application further comprises: based on the first computing device having sufficient available storage space to install the application, downloading, by the one or more processors, the application from the computing system; and installing, by the one or more processors, the application.

Example 4. The method of example 3, wherein downloading the application from the computing system further comprises: determining, by the one or more processors, that the first computing device is unable to successfully download the application from the computing system; and in response to determining that the first computing device is unable to successfully download the application from the computing system, scheduling, by the one or more processors, downloading of the application at a later time.

Example 5. The method of any of examples 2-4, wherein re-attempting to install the application further comprises: receiving, by the one or more processors, an indication of user input that corresponds to launching the stub associated with the application; and in response to receiving the indication of the user input that corresponds to launching the stub associated with the application, re-attempting, by the one or more processors, to install the application.

Example 6. The method of any of examples 1-5, wherein downloading the stub associated with the application further comprises: authenticating, by the one or more processors, that the request is sent by the second computing device signed into the same user account as the first computing device; verifying, by the one or more processors, the request as being intended for the first computing device; and in response to successfully authenticating that the request is sent by the second computing device signed into the same user account as the first computing device and successfully verifying the request as being intended for the first computing device, downloading, by the one or more processors, the stub associated with the application from the computing system.

Example 7. The method of any of examples 1-6, wherein receiving the request to install the application at the first computing device further comprises: querying, by the one or more processors, the computing system for queued requests to install applications at the first computing device; and in response to querying the computing system, receiving, by the one or more processors and from the computing system, the request to install the application.

Example 8. The method of any of examples 1-6, wherein receiving the request to install the application at the first computing device further comprises: receiving, by the one or more processors and via a direct wireless connection between the first computing device and the second computing device, the request to install the application from the second computing device.

Example 9. The method of any of examples 1-8, wherein based on the first computing device not having sufficient available storage space to install the application, downloading the stub associated with the application from the computing system further comprises: determining, by the one or more processors, that the first computing device does not have sufficient available storage space to install the application; and in response to determining that the first computing device does not have sufficient available storage space to install the application, downloading, by the one or more processors, the stub associated with the application from the computing system.

Example 10. A computing device comprising: a memory that stores instructions; and one or more processors that execute the instructions to: receive a request to install an application at the computing device, wherein the request is sent by a second computing device signed into a same user account as the computing device; in response to receiving the request and based on the computing device not having sufficient available storage space to install the application, download a stub associated with the application from a computing system, and install the stub associated with the application.

Example 11. The computing device of example 10, wherein the one or more processors are further configured to: after installing the stub associated with the application, re-attempt to install the application.

Example 12. The computing device of example 11, wherein to re-attempt to install the application, the one or more processors are further configured to: based on the computing device having sufficient available storage space to install the application, download the application from the computing system; and install the application.

Example 13. The computing device of example 12, wherein to download the application from the computing system, the one or more processors are further configured to: determine that the computing device is unable to successfully download the application from the computing system; and in response to determining that the computing device is unable to successfully download the application from the computing system, schedule downloading of the application at a later time.

Example 14. The computing device of any of examples 11-13, wherein to re-attempt to install the application, the one or more processors are further configured to: receive an indication of user input that corresponds to launching the stub associated with the application; and in response to receiving the indication of the user input that corresponds to launching the stub associated with the application, re-attempt to install the application.

Example 15. The computing device of any of examples 10-14, wherein to download the stub associated with the application, the one or more processors are further configured to: authenticate that the request is sent by the second computing device signed into the same user account as the computing device; verify the request as being intended for the computing device; and in response to successfully authenticating that the request is sent by the second computing device signed into the same user account as the computing device and successfully verifying the request as being intended for the computing device, download the stub associated with the application from the computing system.

Example 16. The computing device of any of examples 10-15, wherein to receive the request to install the application at the computing device, the one or more processors are further configured to: query the computing system for queued requests to install applications at the computing device; and in response to querying the computing system, receive, from the computing system, the request to install the application.

Example 17. The computing device of any of examples 10-15, wherein to receive the request to install the application at the computing device, the one or more processors are further configured to: receive, via a direct wireless connection between the computing device and the second computing device, the request to install the application from the second computing device.

Example 18. The computing device of any of examples 10-17, wherein to, based on the computing device not having sufficient available storage space to install the application, download the stub associated with the application from the computing system, the one or more processors are further configured to: determine that the computing device does not have sufficient available storage space to install the application; and in response to determining that the computing device does not have sufficient available storage space to install the application, download the stub associated with the application from the computing system.

Example 19. A computer-readable storage medium storing instructions that, when executed, cause one or more processors of a first computing device to: receive a request to install an application at the first computing device, wherein the request is sent by a second computing device signed into a same user account as the first computing device; in response to receiving the request and based on the first computing device not having sufficient available storage space to install the application, download a stub associated with the application from a computing system, and install the stub associated with the application.

Example 20. A method comprising: receiving, by one or more processors of a computing system and from a computing device, a request to download an application; and in response to receiving the request and based on the computing device not having sufficient available storage space to install the application, sending, by the one or more processors and to the computing device, a stub associated with the application for installation at the computing device.

Example 21. The method of example 20, wherein based on the computing device not having sufficient available storage space to install the application, sending, to the computing device, the stub associated with the application for installation at the computing device further comprises: determining, by the one or more processors, that the computing device does not have sufficient available storage space to install the application; and in response to determining that the computing device does not have sufficient available storage space to install the application, sending, by the one or more processors and to the computing device, the stub associated with the application for installation at the computing device.

Example 22. The method of any of examples 20 and 21, further comprising: receiving, by the one or more processors and from the computing device, a subsequent request to download the application; in response to receiving the subsequent request, determining, by the one or more processors, that the computing device does have sufficient available storage space to install the application; and in response to determining that the computing device does have sufficient available storage space to install the application, sending, by the one or more processors and to the computing device, the application for installation at the computing device.

Example 23. The method of example 22, wherein sending, to the computing device, the application for installation at the computing device further comprises: determining, by the one or more processors, that the computing device is unable to successfully download the application from the computing system; and in response to determining that the computing device is unable to successfully download the application from the computing system, scheduling, by the one or more processors, sending of the application to the computing device at a later time.

Example 24. The method of any of examples 20-23, further comprising: receiving, by the one or more processors and from a second computing device signed into a same user account as the computing device, a request for the computing device to install the application; and forwarding, by the one or more processors, the request to the computing device.

Example 25. The method of example 24, wherein forwarding, to the computing device, the request for the computing device to install the application further comprises: determining, by the one or more processors, that the computing system is unable to forward the request to the computing device; in response to determining that the computing system is unable to forward the request to the computing device, queuing, by the one or more processors, the request at the computing system; after queuing the request, receiving, by the one or more processors and from the computing device, a query for queued requests to install applications at the computing device; and in response to receiving the query, forwarding, by the one or more processors, the queued request to the computing device.

Example 26. The method of any of examples 20-25, further comprising: receiving, by the one or more processors and from a second computing device signed into a same user account as the computing device, a second request for the computing device to install a second application; determining, by the one or more processors, that the computing system is unable to forward the second request to the computing device; in response to determining that the computing system is unable to forward the second request to the computing device, queuing, by the one or more processors, the second request at the computing system; determining, by the one or more processors, that the queued second request has not been forwarded to the computing device for a specified time period; and in response to determining that the queued second request has not been forwarded to the computing device for the specified time period, sending, by the one or more processors and to the second computing device, an indication that the second request has failed.

Example 27. A computing system comprising: a memory that stores instructions; and one or more processors that execute the instructions to: receive, from a computing device, a request to download an application; and in response to receiving the request and based on the computing device not having sufficient available storage space to install the application, send, to the computing device, a stub associated with the application for installation at the computing device.

Example 28. The computing system of example 27, wherein to, based on the computing device not having sufficient available storage space to install the application, send, to the computing device, the stub associated with the application for installation at the computing device, the one or more processors are further configured to: determine that the computing device does not have sufficient available storage space to install the application; and in response to determining that the computing device does not have sufficient available storage space to install the application, send, to the computing device, the stub associated with the application for installation at the computing device.

Example 29. The computing system of any of examples 27 and 28, wherein the one or more processors are further configured to: receive, from the computing device, a subsequent request to download the application; in response to receiving the subsequent request, determine that the computing device does have sufficient available storage space to install the application; and in response to determining that the computing device does have sufficient available storage space to install the application, send, to the computing device, the application for installation at the computing device.

Example 30. The computing system of example 29, wherein to send, to the computing device, the application for installation at the computing device, the one or more processors are further configured to: determine that the computing device is unable to successfully download the application from the computing system; and in response to determining that the computing device is unable to successfully download the application from the computing system, schedule sending of the application to the computing device at a later time.

Example 31. The computing system of any of examples 27-30, wherein the one or more processors are further configured to: receive, from a second computing device signed into a same user account as the computing device, a request for the computing device to install the application; and forward the request to the computing device.

Example 32. The computing system of example 31, wherein to forward, to the computing device, the request for the computing device to install the application, the one or more processors are further configured to: determine that the computing system is unable to forward the request to the computing device; in response to determining that the computing system is unable to forward the request to the computing device, queue the request at the computing system; after queuing the request, receive, from the computing device, a query for queued requests to install applications at the computing device; and in response to receiving the query, forward the queued request to the computing device.

Example 33. The computing system of any of examples 27-32, wherein the one or more processors are further configured to: receive, from a second computing device signed into a same user account as the computing device, a second request for the computing device to install a second application; determine that the computing system is unable to forward the second request to the computing device; in response to determining that the computing system is unable to forward the second request to the computing device, queue the second request at the computing system; determine that the queued second request has not been forwarded to the computing device for a specified time period; and in response to determining that the queued second request has not been forwarded to the computing device for the specified time period, send, to the second computing device, an indication that the second request has failed.

Example 34. A computer-readable storage medium storing instructions that, when executed, cause one or more processors of a computing system to: receive, from a computing device, a request to download an application; and in response to receiving the request and based on the computing device not having sufficient available storage space to install the application, send, to the computing device, a stub associated with the application for installation at the computing device.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and micro-wave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
receiving, by one or more processors of a first computing device, a request to install an application at the first computing device, wherein the request is sent by a second computing device signed into a same user account as the first computing device;
responsive to receiving the request, determining whether the first computing device has sufficient available storage space to install the application;

responsive to determining that the first computing device has sufficient available storage space to install the application:
downloading, by the one or more processors and from a computing system, the application; and
installing, by the one or more processors, the application at the first computing device; and
responsive to determining that the first computing device does not have sufficient available storage space to install the application:
downloading, by the one or more processors and from the computing system, a stub associated with the application, wherein the stub is a placeholder file which requires less storage space than the application; and
installing, by the first computing device, the stub associated with the application.

2. The method of claim 1, further comprising:
after installing the stub associated with the application, re-attempting, by the one or more processors, to install the application.

3. The method of claim 2, wherein the re-attempting to install the application further comprises:
responsive to determining, at a later time, that the first computing device has sufficient available storage space to install the application:
downloading, by the one or more processors, the application from the computing system; and
installing, by the one or more processors, the application.

4. The method of claim 2, wherein re-attempting to install the application further comprises:
receiving, by the one or more processors, an indication of user input that corresponds to launching the stub associated with the application; and
in response to receiving the indication of the user input that corresponds to launching the stub associated with the application, re-attempting, by the one or more processors, to install the application.

5. The method of claim 1, wherein the downloading the application from the computing system further comprises:
determining, by the one or more processors, that the first computing device is unable to successfully download the application from the computing system; and
in response to determining that the first computing device is unable to successfully download the application from the computing system, scheduling, by the one or more processors, downloading of the application at a later time.

6. The method of claim 1, wherein the downloading the stub associated with the application further comprises:
authenticating, by the one or more processors, that the request is sent by the second computing device signed into the same user account as the first computing device;
verifying, by the one or more processors, the request as being intended for the first computing device; and
in response to successfully authenticating that the request is sent by the second computing device signed into the same user account as the first computing device and successfully verifying the request as being intended for the first computing device, downloading, by the one or more processors, the stub associated with the application from the computing system.

7. The method of claim 1, wherein receiving the request to install the application at the first computing device further comprises:

querying, by the one or more processors, the computing system for queued requests to install applications at the first computing device; and in response to the querying the computing system, receiving, by the one or more processors and from the computing system, the request to install the application.

8. The method of claim 1, wherein receiving the request to install the application at the first computing device further comprises:

receiving, by the one or more processors and via a direct wireless connection between the first computing device and the second computing device, the request to install the application from the second computing device.

9. A computing device comprising:

a memory that stores instructions; and one or more processors that execute the instructions to:

receive a request to install an application at the computing device, wherein the request is sent by a second computing device signed into a same user account as the computing device;

responsive to receiving the request to install the application, determine whether the computing device has sufficient available storage space to install the application;

responsive to determining that the computing device has sufficient available storage space to install the application:

download, from a computing system, the application and install the application at the computing device; and responsive to determining that the computing device does not have sufficient available storage space to install the application:

download a stub associated with the application from the computing system, wherein the stub is a placeholder file which requires less storage space than the application; and install the stub associated with the application.

10. The computing device of claim 9, wherein the one or more processors are further configured to:

after installing the stub associated with the application, re-attempt to install the application.

11. The computing device of claim 10, wherein to re-attempt to install the application, the one or more processors are further configured to:

responsive to determining, at a later time, that the computing device has sufficient available storage space to install the application:

download the application from the computing system; and install the application.

12. The computing device of claim 10, wherein to re-attempt to install the application, the one or more processors are further configured to:

receive an indication of user input that corresponds to launching the stub associated with the application; and in response to receiving the indication of the user input that corresponds to launching the stub associated with the application, re-attempt to install the application.

13. The computing device of claim 10, wherein to download the application from the computing system, the one or more processors are further configured to:

determine that the computing device is unable to successfully download the application from the computing system; and in response to determining that the computing device is unable to successfully download the application from the computing system, schedule downloading of the application at a later time.

14. The computing device of claim 9, wherein to download the stub associated with the application, the one or more processors are further configured to:

authenticate that the request is sent by the second computing device signed into the same user account as the computing device;

verify the request as being intended for the computing device; and in response to successfully authenticating that the request is sent by the second computing device signed into the same user account as the computing device and successfully verifying the request as being intended for the computing device, download the stub associated with the application from the computing system.

15. The computing device of claim 9, wherein to receive the request to install the application at the computing device, the one or more processors are further configured to:

query the computing system for queued requests to install applications at the computing device; and in response to querying the computing system, receive, from the computing system, the request to install the application.

16. The computing device of claim 9, wherein to receive the request to install the application at the computing device, the one or more processors are further configured to:

receive, via a direct wireless connection between the computing device and the second computing device, the request to install the application from the second computing device.

17. A non-transitory computer-readable storage medium storing instructions that, when executed, cause one or more processors of a first computing device to:

receive a request to install an application at the first computing device, wherein the request is sent by a second computing device signed into a same user account as the first computing device;

responsive to receiving the request to install the application, determine whether the first computing device has sufficient available storage space to install the application;

responsive to determining that the first computing device has sufficient available storage space to install the application:

download, from a computing system, the application; and install the application at the first computing device; and responsive to determining that the first computing device does not have sufficient available storage space to install the application:

download a stub associated with the application from the computing system, wherein the stub is a placeholder file which requires less storage space than the application; and install the stub associated with the application.

* * * * *